US009240904B2

(12) United States Patent
LaFreniere et al.

(10) Patent No.: US 9,240,904 B2
(45) Date of Patent: Jan. 19, 2016

(54) SYSTEM AND METHOD FOR A MESSAGING ASSISTANT (75) Inventors: Gary W. LaFreniere, Olathe, KS (US); David E. Emerson, Overland Park, KS (US); David E. Rondeau, Olathe, KS (US)

(73) Assignee: CenturyLink Intellectual Property LLC, Denver, CO (US)

(*) Notice: Subject to any disclaimer, the term of this patent is extended or adjusted under 35 U.S.C. 154(b) by 388 days.

(21) Appl. No.: 12/012,151

(22) Filed: Jan. 31, 2008

(65) Prior Publication Data

US 2009/0198777 A1    Aug. 6, 2009

(51) Int. Cl.
G06F 15/16    (2006.01)
H04L 12/58    (2006.01)

(52) U.S. Cl.
CPC .......... H04L 12/5875 (2013.01); H04L 12/589 (2013.01); H04L 51/30 (2013.01); H04L 51/36 (2013.01)

(58) Field of Classification Search
USPC .................................................. 709/206, 248
See application file for complete search history.

(56) References Cited

U.S. PATENT DOCUMENTS

| | | | |
|---|---|---|---|
| 6,393,464 B1 | 5/2002 | Dieterman | |
| 6,615,242 B1 | 9/2003 | Riemers | |
| 6,650,739 B1* | 11/2003 | Doeberl et al. | 379/88.18 |
| 6,732,157 B1 | 5/2004 | Gordon et al. | |
| 7,174,453 B2 | 2/2007 | Lu | |
| 7,302,272 B2 | 11/2007 | Ackley | |
| 7,487,132 B2 | 2/2009 | Auvenshine | |
| 7,636,947 B2 | 12/2009 | Peled et al. | |
| 7,640,336 B1 | 12/2009 | Lu et al. | |
| 7,664,819 B2 | 2/2010 | Murphy et al. | |
| 7,693,071 B2 | 4/2010 | Achlioptas et al. | |
| 8,001,609 B1 | 8/2011 | Chan et al. | |
| 8,099,780 B2 | 1/2012 | Lu | |
| 8,352,557 B2 | 1/2013 | Gupta | |
| 8,538,466 B2 | 9/2013 | Gupta et al. | |
| 8,621,023 B2 | 12/2013 | Gupta | |
| 9,143,474 B2 | 9/2015 | Gupta | |
| 2002/0116641 A1 | 8/2002 | Mastrianni | |
| 2003/0220978 A1 | 11/2003 | Rhodes | |
| 2004/0005877 A1* | 1/2004 | Vaananen | 455/413 |
| 2004/0014456 A1* | 1/2004 | Vnnen | 455/413 |
| 2004/0260924 A1 | 12/2004 | Peled et al. | |
| 2005/0010644 A1* | 1/2005 | Brown et al. | 709/206 |
| 2005/0021637 A1 | 1/2005 | Cox | |
| 2005/0041789 A1 | 2/2005 | Warren-Smith et al. | |
| 2005/0050150 A1 | 3/2005 | Dinkin | |
| 2005/0080854 A1* | 4/2005 | Tervo | 709/206 |
| 2005/0149622 A1 | 7/2005 | Kirkland et al. | |
| 2005/0160144 A1 | 7/2005 | Bhatia | |
| 2005/0256929 A1 | 11/2005 | Bartol et al. | |

(Continued)

FOREIGN PATENT DOCUMENTS

WO    WO 2005081664 A2    9/2005

OTHER PUBLICATIONS

U.S. Appl. No. 12/363,430; Final Rejection dated Sep. 22, 2011; 11 pages.

(Continued)

Primary Examiner — Philip B Tran
(74) Attorney, Agent, or Firm — Swanson & Bratschun, L.L.C.

(57) ABSTRACT

A system and method for utilizing a message assistant. A contact list is updated by retrieving one or more contact lists. Preferences are received for communicating with contacts on the contact list. A message is received to be sent to a group listed in the contact list including one or more contacts at a time specified by a user. The message is sent to the group at the time specified by the user based on the preferences.

24 Claims, 6 Drawing Sheets

(56) References Cited

U.S. PATENT DOCUMENTS

| | | | |
|---|---|---|---|
| 2006/0031311 | A1 | 2/2006 | Whitney et al. |
| 2006/0041625 | A1 | 2/2006 | Chen et al. |
| 2006/0059238 | A1 | 3/2006 | Slater et al. |
| 2006/0174111 | A1 | 8/2006 | Burns |
| 2007/0016641 | A1 | 1/2007 | Broomhall |
| 2007/0070940 | A1* | 3/2007 | Vander Veen et al. ........ 370/328 |
| 2007/0071213 | A1 | 3/2007 | Claudatos et al. |
| 2007/0260603 | A1 | 11/2007 | Tuscano et al. |
| 2008/0005316 | A1 | 1/2008 | Feaver et al. |
| 2008/0064381 | A1 | 3/2008 | Ackley |
| 2008/0070608 | A1 | 3/2008 | Ackley |
| 2008/0070609 | A1 | 3/2008 | Ackley |
| 2008/0114838 | A1 | 5/2008 | Taylor |
| 2008/0162642 | A1 | 7/2008 | Bachiri et al. |
| 2008/0165944 | A1* | 7/2008 | Rosenthal et al. ....... 379/202.01 |
| 2008/0293383 | A1 | 11/2008 | Rastas |
| 2008/0319949 | A1 | 12/2008 | Irving et al. |
| 2009/0006564 | A1 | 1/2009 | Kay et al. |
| 2009/0044006 | A1 | 2/2009 | Shim et al. |
| 2009/0063133 | A1 | 3/2009 | Auvenshine |
| 2009/0083385 | A1 | 3/2009 | Heredia et al. |
| 2009/0172121 | A1 | 7/2009 | Tanaka |
| 2009/0193075 | A1 | 7/2009 | Persinger |
| 2009/0198778 | A1 | 8/2009 | Priebe |
| 2009/0228557 | A1 | 9/2009 | Ganz et al. |
| 2009/0299927 | A1 | 12/2009 | Chen et al. |
| 2010/0017371 | A1* | 1/2010 | Whalin et al. .................... 707/3 |
| 2010/0017864 | A1 | 1/2010 | Codignotto |
| 2010/0035639 | A1 | 2/2010 | Gupta et al. |
| 2010/0036918 | A1 | 2/2010 | Gupta |
| 2010/0049814 | A1 | 2/2010 | Turakhia |
| 2013/0097268 | A1 | 4/2013 | Gupta |
| 2014/0082742 | A1 | 3/2014 | Gupta |

OTHER PUBLICATIONS

U.S. Appl. No. 12/363,430; Non-Final Rejection dated Jun. 9, 2011; 13 pages.
U.S. Appl. No. 12/189,565; Final Rejection dated Dec. 8, 2010; 23 pages.
U.S. Patent Application No. 12/189,565; Non-Final Rejection dated Jun. 22, 2010; 35 pages.
U.S. Appl. No. 12/189,565; Non-Final Rejection dated Jun. 27, 2012; 23 pages.
U.S. Appl. No. 12/189,565; Non-Final Rejection dated Nov. 4, 2011; 32 pages.
U.S. Appl. No. 12/189,565; Notice of Allowance dated Jun. 8, 2012; 44 pages.
http://www.adaptivemobile.com/Solutions/listcat/16; 2 pages.
http://www.anam.com/parentalcontrol.php; 1 page.
http://www.spy-mobile-phone.com/sms-spy.html; 5 pages.
http://www.parentalsoftware.org/cellphone-spy.html; 4 pages.
http://www.tango.ie/solutions/parentalcontrol.asp; 1 page.
U.S. Patent Application No. 12/189,565; Issue Notification dated Dec. 18, 2012; 1 page.
U.S. Patent Application No. 13/708,750; Non-Final Rejection dated Mar. 5, 2013; 52 pages.
U.S. Appl. No. 12/363,430; Notice of Allowance dated May 23, 2013; 25 pages.
U.S. Appl. No. 13/708,750; Notice of Allowance dated Aug. 20, 2013; 70 pages.
U.S. Appl. No. 12/363,430; Issue Notification dated Aug. 28, 2013; 1 page.
U.S. Appl. No. 13/708,750; Issue Notification dated Dec. 11, 2013; 1 page.
U.S. Appl. No. 12/189,565; Notice of Allowance dated Sep. 7, 2012, 13 pages.
U.S. Appl. No. 14/084,788; Non-Final Rejection dated Feb. 6, 2015; 40 pages.
U.S. Appl. No. 14/084,788; Notice of Allowance dated May 22, 2015; 44 pages.
U.S. Appl. No. 14/084,788; Issue Notification dated Sep. 2, 2015; 1 page.

* cited by examiner

| 500 | Message Assistant GUI – Address Book | | | |
|---|---|---|---|---|
| 502 | Account Number 1234567 | | 504 Date: September 8th, 2010 | |
| 506 | Username: testuser | | | |
| 508 | Password: ******** | | | |

| 510 | Recipients ▼ | Names or groups: | Family |
|---|---|---|---|
| | | | Golf Friends |

| 512 | New Contact or Edit: | New |
|---|---|---|
| | | Edit |

| 514 | Contact 1: | David Emerson | | |
|---|---|---|---|---|
| | Default Method | | 913-555-1234 | wireless |
| | wireless | | 913-555-5555 | home |
| | | | David@david.com | email |
| | Member of GROUP: | Golf Friends | | |

| 516 | Contact 2: | Chris White | | |
|---|---|---|---|---|
| | Default Method | | 541-555-1236 | wireless |
| | email | | 128.33.456.23 | home |
| | | | Chris@chris.net | email |
| | Member of GROUP: | Golf Friends | Family | |

| 518 | Contact 3: | Melissa LaFreniere | | |
|---|---|---|---|---|
| | Default Method | | 913-333-1235 | wireless |
| | home | | 913-333-3333 | home |
| | | | Melissa@mel.org | email |
| | Member of GROUP: | Family | | |

FIG. 6

```
┌─────────────────────────────────────────────────────────────┐
│              Message Assistant GUI    600                    │
├─────────────────────────────────────────────────────────────┤
│  │Account Number 1234567│        Date: September 8th, 2010  │
│  │Username: testuser   │                                    │
│  Password: ********                                         │
├─────────────────────────────────────────────────────────────┤
│  602 — ☑  Send New Message                                  │
│                                                              │
│       ┌─────────────┐ ▼  ┌──────────────┐ ┌──────────────┐ │
│  604  │ Recipients  │    │Names or groups│ │   Family     │ │
│       └─────────────┘    └──────────────┘ │ Golf Friends │ │
│                                            └──────────────┘ │
├─────────────────────────────────────────────────────────────┤
│       Date & Time for greeting delivery                      │
│  606  Date  │12/25/2007│   Time  │8:30 a.m.│                │
├─────────────────────────────────────────────────────────────┤
│  608 ┌──────────────────────────────────────────┐           │
│      │                                           │    ✓      │
│      │           Merry Christmas!                │  Send Messge│
│      └──────────────────────────────────────────┘    610    │
├─────────────────────────────────────────────────────────────┤
│       Preferences                                            │
│       ☑    Send using default recipient settings?           │
│       ☐    Override Defaults?                               │
│  614  ☑   Leave signature                                   │
│       ☑  Store Message in history                           │
│       ☑  Retry outbound text to voice faluire?              │
│            ☑ Specify interval  45 minutes                   │
└─────────────────────────────────────────────────────────────┘
```

SYSTEM AND METHOD FOR A MESSAGING ASSISTANT

BACKGROUND OF THE INVENTION

Description of the Related Art

The growth in communications related technology has increased nearly exponentially in recent years. The growth is fostered by enhanced technology, hardware, software, protocols, and communication standards. In some cases, users have become accustomed to utilizing different services and features to communicate with family, friends, business associates, and other contacts. A single user may have any number of address books, contact lists, and other communication information that may be used under different circumstances, with different communications devices, and based on availability and context.

As a result, many individuals do not always have access to the communication information most frequently used. Instead, the user must try to remember the contact information, use alternative forms of communication, or request the contact information.

BRIEF SUMMARY OF THE INVENTION

One embodiment provides a system and method for utilizing a message assistant. A contact list may be updated by retrieving one or more contact lists. Preferences may be received for communicating with contacts on the contact list. A message may be received to be sent to a group listed in the contact list including one or more contacts at a time specified by a user. The message may be sent to the group at the time specified by the user based on the preferences.

Another embodiment provides a messaging assistant system. The system may include a scheduler configured to receive preferences for communicating with one or more contacts and a time for sending a message. The system may also include a message coordinator configured to receive the message as set by a user to be sent to the one or more contacts. The system may also include a contact list configured to store and update the one or more contacts from one or more contact lists retrieved from externally accessible websites and servers.

Yet another embodiment provides a messaging assistant. The messaging system may include a processor for executing a set of instructions and a memory for storing the set of instructions. The set of instructions may be configured to update a contact list from one or more contact lists, receive preferences for communicating with individuals on the contact list, receive a message to be sent to a group in the contact list including one or more users at a time specified by a user, send the message to the group at the time based on the preferences.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Illustrative embodiments of the present invention provide a system and method for sending a message to a group or number of contacts from a master contact list. The message and the master contact list are managed by a messaging assistant. The messaging assistant is an application or device accessible through a network connection, such as a cell phone, WiFi, WiMAX, Ethernet, data, or packet network. For example, the messaging assistant may be a web application available to a user utilizing a wireless device through the Internet provided by a communications service provider on a dedicated server. Alternatively, the messaging assistant in the most recently cached version of the master contact list may be stored on a communications device. In one embodiment, the messaging assistant is accessible by a user through a communications device. The communications device may be a personal computer, cell phone, personal digital assistant (PDA), laptop, or other computing or communications enabled device.

The master contact list is a compilation of other contact lists and information. The master contact list may be updated, extracted, synchronized, edited, or compiled from any number of contact lists, email services, web accounts, professional contact services, business accounts, or devices externally accessible by the messaging assistant. The user may enter a set message and then send the message as established by the user to the group based on pre-specified contact information. The contact information may specify which devices, numbers, accounts, usernames, or other information the message is sent to. For example, the contact information and default settings for each user may specify a cell phone, instant messaging service and username, account, IP address, phone number, or other information as well as whether the message is to be transmitted via a call, email, text message, instant message, voicemail transfer, or other delivery method and the scheduled delivery time for the message. The user may edit the default settings for contacting each contact within the group as needed.

Additionally, the user may set contact priorities in case the first message is not properly transmitted or received. For example, if a text message that is converted to voice is unable to be delivered to a home voice over Internet Protocol phone, the message may be delivered as an email message. Any number of backup communications methods may be specified as well as criteria specifying whether a message has not been delivered or is considered undeliverable.

Figure 1:
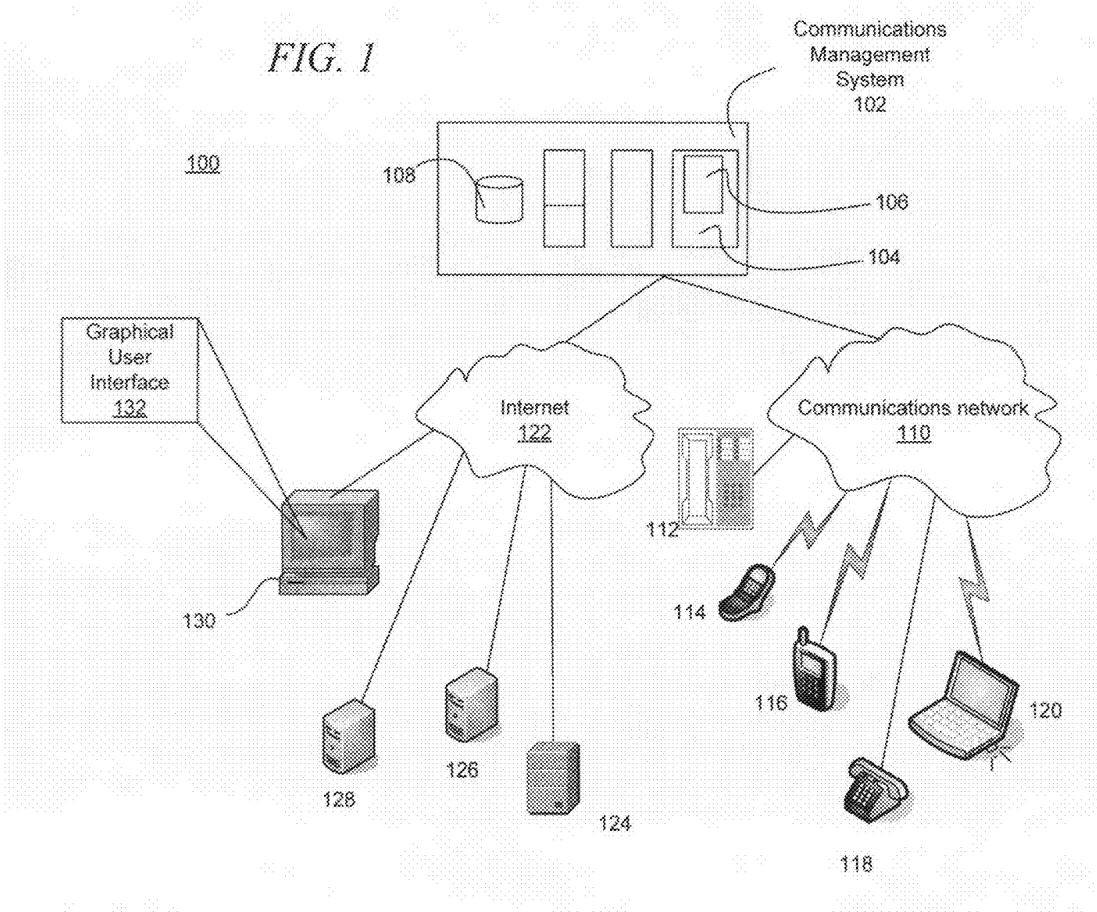
FIG. 1 is a pictorial representation of a communications system in accordance with an illustrative embodiment.

FIG. 1 is a pictorial representation of a communications system in accordance with an illustrative embodiment. The communication system 100 may include any number of networks, devices, interfaces, and communications enabled devices. In one embodiment, the communication system 100 includes a communication management system 102, a server 104, messaging application 106, database 108, communications network 110, voice over Internet Protocol (VoIP) phone 112, wireless devices 114 and 116, plain old telephone service (POTS) phone 118, soft phone 120, Internet 122, servers 124, 126, and 128, client 130, and graphical user interface (GUI) 132.

The communications management system 102 is a system configured to control communications through the communications network 110 and receive input and information and communications through the Internet 122. The communications management system 102 may be one or more devices including a category 5 switch, a router, a server, and any other communications devices that may be used in the communications network 110. In one embodiment, the communications management system 102 may include servers and switches for generating, routing, and receiving text, video, chat, email, and short message service messages. The communications management system 102 may convert messages to formats that may be transmitted or received between multiple communications networks. For example, a single message set to be sent by a user may be converted to a text message, email, audio file for playback through a telephone, chat message, or other format.

In one embodiment, the communications management system 102 includes the server 104 and the database 108. The server 104 is a computing device suitable for storing and executing the messaging application 106 as a software application, logic, or hardware. The server 104 may store and operate the messaging application 106. For example, the messaging application 106 may be an application utilized and implemented by a user through the Internet 122. The messaging application 106 may also be a discrete program or application that may be downloaded on the VoIP phone 112, wireless devices 114 and 116, soft phone 120, or client 130. Alternatively, the messaging application 106 may be logic programmed or integrated as part of the server 104.

The messaging application 106 stores contact information retrieved from any number of services, devices, programs, or other user specified applications and devices. As shown, the messaging application 106 accesses the servers 124, 126, and 128 through the Internet 122 to retrieve contact lists and information. The contact information specifies contact and communication information for multiple individuals automatically or manually selected by the user. The contact information may include all applicable business, organization, and personal contacts of the user including phone numbers, Internet Protocol (IP) addresses, email addresses, usernames, account numbers, nicknames, or other identifiers. In one example, the messaging application 106 may retrieve work related contact information from the programs and servers, which may include Microsoft Outlook® utilized by the user's employer from server 124. In another example, the messaging application 106 may retrieve contact information from the user's Google® business account from server 126. The user may also retrieve contact information from a personal Yahoo!® account from server 128.

The messaging application 106 may retrieve and store the contact information in a separate or master contact list. The master contact list may be stored within the server 104, in the database 108, or in another accessible device. The master contact list may be compiled or retrieved manually based on user feedback or automatically. In one embodiment, the messaging application 106 may poll or scan the servers 124, 126, and 128 at specified intervals to determine if applicable contact information has been added, deleted, edited, or otherwise changed. The master contact list is updated based on the information. The interval used to perform automatic updates may be saved as user preferences in the messaging application 106 by the user. The user may specify hours, days, weeks, months, or any time period for the interval. In another embodiment, the user may provide specific user input instructing the messaging application 106 to poll the servers 124, 126, and 128.

The communications network 110 may be a digital analog, packet, wireless, wire line, VOIP communications network, or a combination of network types. The communications network 110 may communicate with the voice over Internet Protocol (VoIP) phone 112, wireless devices 114 and 116, the plain old telephone service (POTS) phone 118, and the soft phone 120 using a fiber optic, twisted pair, Ethernet, analog, digital, wireless signal, or other communications line, link standard, or protocol suitable for enabling voice communications.

The client 130 may be a computing device suitable for displaying the GUI 132 to the user. For example, the client 130 may be a personal computer and the GUI 132 may be integrated or accessible from an application, such as a web browser. In another embodiment, the GUI 132 may be a secure client executed by a data processing system to perform the features and tasks described herein. Alternatively, the GUI 132 may be part of a website provided by the communication management system 102 to allow the user to generate a message, edit the master contact list, or set user preferences.

The communication management system 102 may include a host application or dedicated device for managing communication with one or more remote clients. A user may be required to provide a secure identifier, such as a username, password, or other authentication code or hardware interface that verifies the user is authorized to make changes within the communication management system 102 before the client 130 is granted access to all or a portion of the host applications. The authentication information may be used to establish a secure connection between the client 130 and the communication management system 102. The secure connection may be a virtual private network tunnel, an encrypted connection, firewall, or other form of secured communications link.

The GUI 132 may be configured to both display and receive information from the user. The GUI 132 may include any number of fields, buttons, drop down lists, icons, and other graphical and visual interfacing elements for display content and receiving user input and selections. In particular, the GUI 132 may display the contact lists, the servers, services and systems from which the contact lists are imported, the master contact list, and a message generation interface. In another embodiment, the user may access the GUI 132 to edit the contact preferences. The coordination and management of messages to be sent may be managed by the communications management system 102 based on input received through the GUI 132. The communications management system 102 may communicate with one or more cellular, GMRS, WiFi, WiMAX, fiber optic, Ethernet, data, packet, or other messaging networks to route a specified message to the intended recipients. The client 130 may access the communications management system 102 through the Internet 116 in order to enable a user to generate a message and deliver it to a group or specified contacts within the master contact list.

Figure 2:
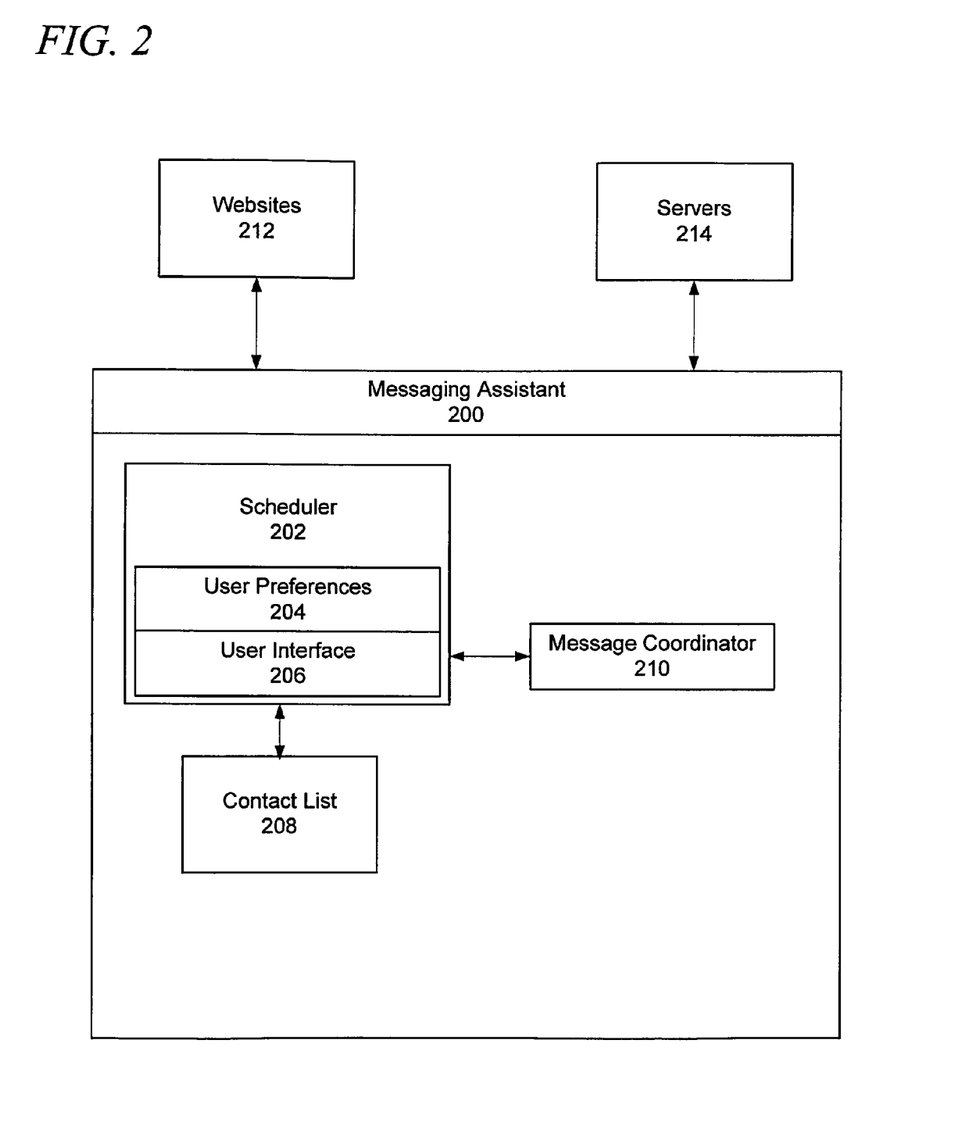
FIG. 2 is a block diagram of a messaging assistant in accordance with an illustrative embodiment.

FIG. 2 is a block diagram of a messaging assistant in accordance with an illustrative embodiment. The messaging assistant 200 is a particular implementation of the messaging assistant 106 of FIG. 1. The messaging assistant 200 may include a scheduler 202, user preferences 204, a user interface 206, a contact list 208 and a message coordinator 210. The messaging assistant 200 may communicate with any number of devices, systems, and applications which may include websites 212 and servers 214. The websites and servers are a particular implementation of servers 124, 126, and 128 of FIG. 1. The websites 212 and servers 214 represent the services and devices that may be polled, scanned, or accessed in order to form the master contact list represented by the contact list 208.

The messaging assistant 200 may be implemented in hardware, software, firmware or other combination of computing elements. In one embodiment, the messaging assistant 200 and corresponding elements may be stored in software modules, instructions, or in a computer readable form. Although not specifically illustrated in FIG. 2, the messaging assistant 200 may include a processor and a memory for executing a set of instructions. The memory may be dynamic or static memory. The elements of the messaging assistant 200 may function individually or collectively to coordinate and send the messages to the designated group or contact at the time and using the communications preferences specified by the user.

The scheduler 202 coordinates when and how any messages are sent. The scheduler 202 may receive user input including date and time for sending one or more messages. The user preferences 204 control the contact information and instructions for communicating with one or more recipients. The user preferences 204 may specify how each recipient is contacted including a default setting. For example, for recipient A, the default communication method may be an email message to a PDA, while for recipient B, the default communication method may be a text-to-speech translation with three attempted deliveries before the message is sent to a voicemail system.

The user preferences 204 may specify alternative delivery methods and may be configured or customized by the user based on the circumstances. In one embodiment, the user preferences 204 specify a priority or ways in which the message is sent. In some cases, a confirmation that the message was received may be required before the message is no longer sent using the default communication method or alternative communications methods. For example, a text message may be the default method, email to a first address may be the first backup, and email to a second work address may be the second backup, and a text-to-voice translation delivered directly to a cell phone or voicemail may be the final backup.

The user interface 206 is an interface configured to receive user input in the form of text, selections, attachments, images, data, and other information. The user interface 206 works in conjunction with the message coordinator 210. The message coordinator 210 may be an engine that receives one or messages and the information for sending the message. The message coordinator 210 functions to receive a message intended for one or more recipients.

The contact list 208 is one embodiment of the master contact list. The contact list 208 may be stored in any electronic format or file, such as a database or spreadsheet. The contact list 208 may be updated, extracted, imported, or synchronized from the websites 212 and servers 214. In one embodiment, the contact list 208 may be an updated cached for usage by the user once a day. The contact list 208 may include any number of contacts, groups, or other communication information that may be grouped, labeled, or otherwise marked for facilitating easy usage. In one embodiment, the contact list 208 may automatically remove redundant entries or contacts that are included in both the websites 212 and servers 214. In another embodiment, the contact list 208 may be set to combine labels or groups from each of the imported contact lists. For example, a group labeled as "friends" in the websites 212 and a group labeled as "my friends" may be grouped to form a single group entitled "friends" in the contact list 208. Additionally, alternative forms of communication, such as a separate cell phone number or email address may be extracted and added to the contact list 208 so that the user has all applicable contact information available.

Figure 3:
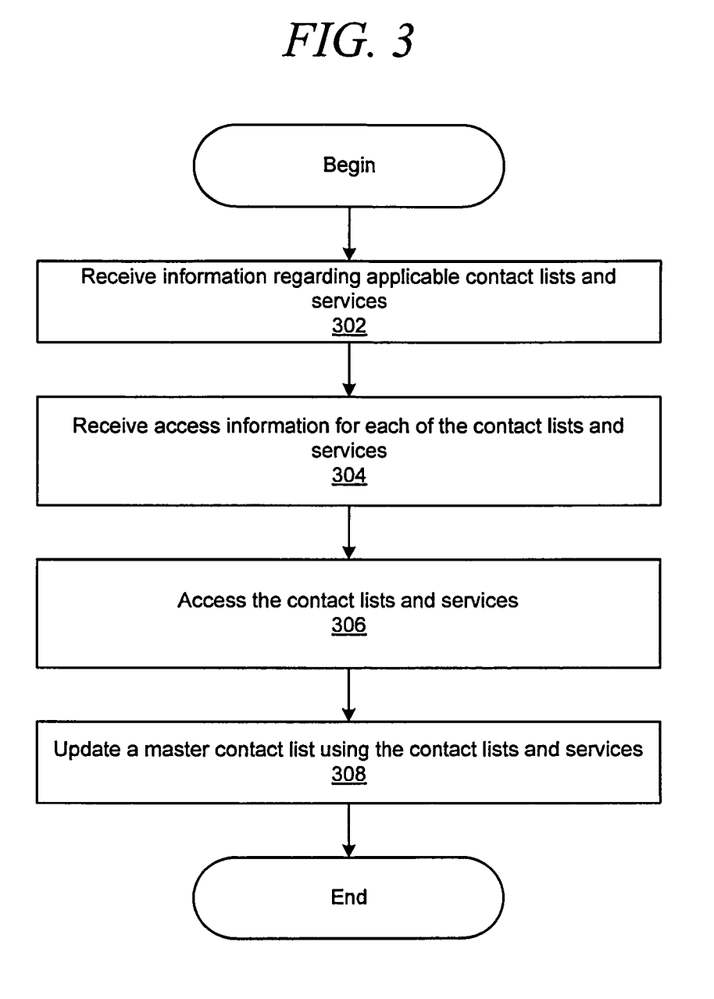
FIG. 3 is a flowchart of a process for configuring a messaging assistant for communications in accordance with an illustrative embodiment.

FIG. 3 is a flowchart of a process for configuring a messaging assistant for communications in accordance with an illustrative embodiment. The process of FIG. 3 may be implemented by a messaging assistant. In one embodiment, the messaging assistant may include multiple applications stored locally within a user's device and a host application available from a server through a network connection. Additionally, the messaging assistant may be computer readable instructions stored in a computer readable format or other software form. The messaging assistant may also be hardware or firmware integrated with a server or other communications device.

The process may begin with the messaging assistant receiving information regarding applicable contact lists and services (step 302). The information may include the names of registered email accounts, contact list services, or other applications. For example, the user may specify the use of Google®, Yahoo®, and MSN® accounts or email accounts, as well as an Outlook® account through work. An automated menu may be presented to the user to prompt the user to enter the information.

Next, the messaging assistant receives access information for each of the contact lists and services (step 304). The access information may include usernames, passwords, types of services utilized, account numbers, and other applicable information. The user may be required to enter websites, Internet Protocol addresses, or other hardware or software information for retrieving the contact lists.

The messaging assistant accesses the contact lists and services (step 306). During step 306, the contact lists and applicable information is retrieved, downloaded, imported, or synchronized from the contact lists and services. In one embodiment, the contact lists may be retrieved as manually selected by a user. For example, the user may use a graphical user interface of the messaging assistant to require the messaging assistant to synchronize itself with the contact lists or services. In another embodiment, the messaging assistant may be configured to automatically verify the content of the services and contact lists every day, once a week, once a month, or as specified by the user. In another embodiment, the messaging assistant may poll the contact lists and services to determine whether changes have been made. If changes are detected, the messaging assistant may synchronize with the contact lists and services.

Next, the messaging assistant updates a master contact list using the contact lists and services (step 308). During step 308, the messaging assistant synchronizes or retrieves the content from the contact lists and services and adds it to the master contact list. The contact lists may be integrated with existing contact lists or they may be provisionally added subject to approval by the user.

Figure 4:
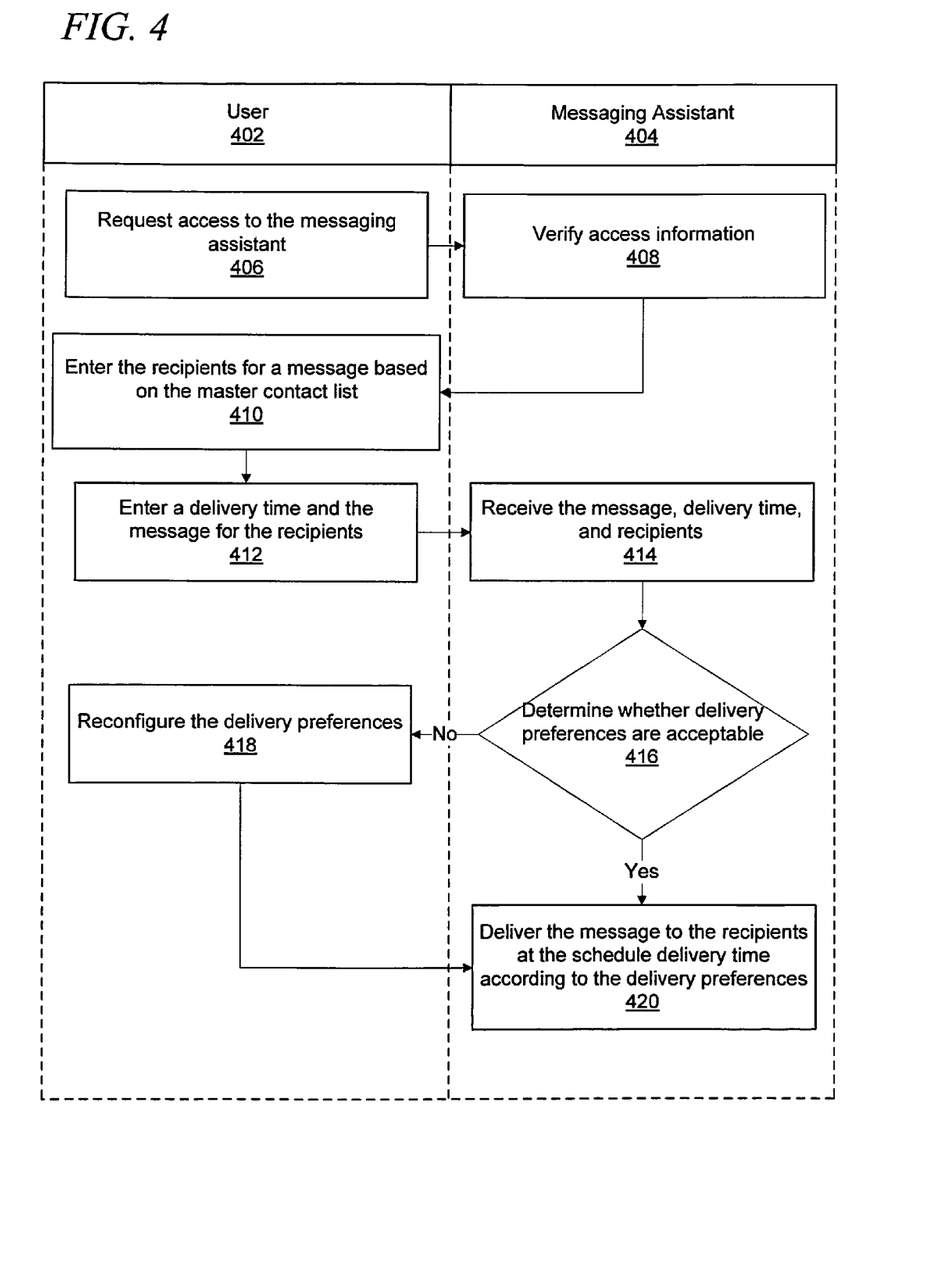
FIG. 4 is a flowchart of a process for communication utilizing a messaging assistant in accordance with an illustrative embodiment.

FIG. 4 is a flowchart of a process for communication utilizing a messaging assistant in accordance with an illustrative embodiment. The process of FIG. 4 may be implemented by a user 402 and a messaging assistant 404. The user may have previously configured the messaging assistant to retrieve and store applicable contact information. The process may begin with the user 402 requesting access to the messaging assistant (step 406). The messaging assistant may be accessed using any number of communications devices enabled to communicate through one or more communications networks. For example, the messaging assistant may be accessed through a cell phone with access to the Internet, by a personal computer using a cable connection, or through a PDA with WiFi access through a hotel connection. In another embodiment, the user 402 may access a locally stored copy of the messaging assistant 404 that is set to periodically synchronize itself with a host messaging assistant application or device.

Next, the messaging assistant 404 verifies access information (step 408). The access information may include a username, password, account number or other similar information to authenticate the identity of the user and verify that the user is authorized to use the message assistant.

Next, the user enters the recipients for a message based on the master contact list (step 410). The recipients may be a group of contacts or other information that was arranged or coordinated using the messaging assistant or in another application before being extracted to the messaging assistant. For example, the recipients may be a number of individuals the user is traveling and working with during a business trip. In another example, the recipients may be family members labeled as immediate family in the master contact list.

The user 402 enters a delivery time and the message of the recipients (step 412). The delivery time may include a time and date for the delivery. The user may also be required to specify the applicable time zone. The message may include text, voice, images, graphics, video, or other data or information. The message may be entered through a graphical user interface of the messaging assistant or may be uploaded.

The messaging assistant 404 receives the message, delivery time, and recipients (step 414). The information of step 404 may be received as entered or based on a user selection. Next, the messaging assistant determines whether delivery preferences are acceptable (step 416). The determination of step 416 may be made based on user feedback. For example, a user may select a button or enter a prompt indicating that the delivery preferences or user preferences need to be reconfigured. The delivery preferences may indicate a specified method of contacting each member of the group. The delivery preferences may also indicate how a message is determined to have been delivered successfully and actions to take in the event the message is not delivered successfully, such as retransmission of the message to an alternative phone number or address.

If the delivery preferences are not acceptable, the user 402 reconfigures the delivery preferences (step 418). The user 402 may enter or edit contact information utilized to send the message. In some cases, the user may be required to enter new contact information or modify existing contact information. Next, the messaging assistant 404 delivers the message to the recipients at the schedule delivery time according to the delivery preferences (step 420).

If the delivery preferences are acceptable in step 416, the messaging assistant 404 immediately performs step 420. As described, in another embodiment, the messaging assistant 404 may take additional steps to resend the message utilizing another listed communications method for one or more of the recipients in response to determine the message was not delivered or undeliverable within the criteria specified by the user. The criteria may indicate time out periods, maximum number of attempts, no usage of voicemail, and other information for defining a failure to deliver the message.

Figure 5:
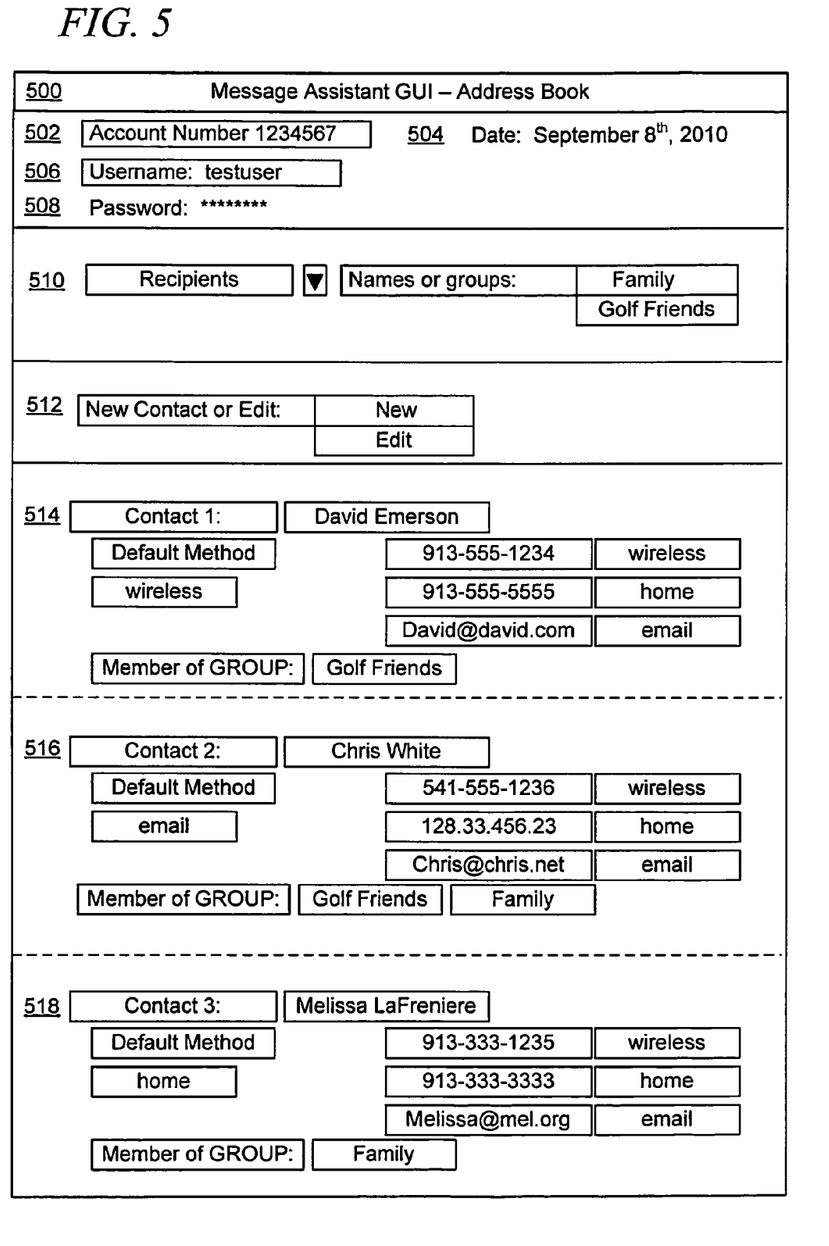
FIG. 5 is a pictorial representation of a messaging assistant graphical user interface in accordance with an illustrative embodiment.
Figure 6:
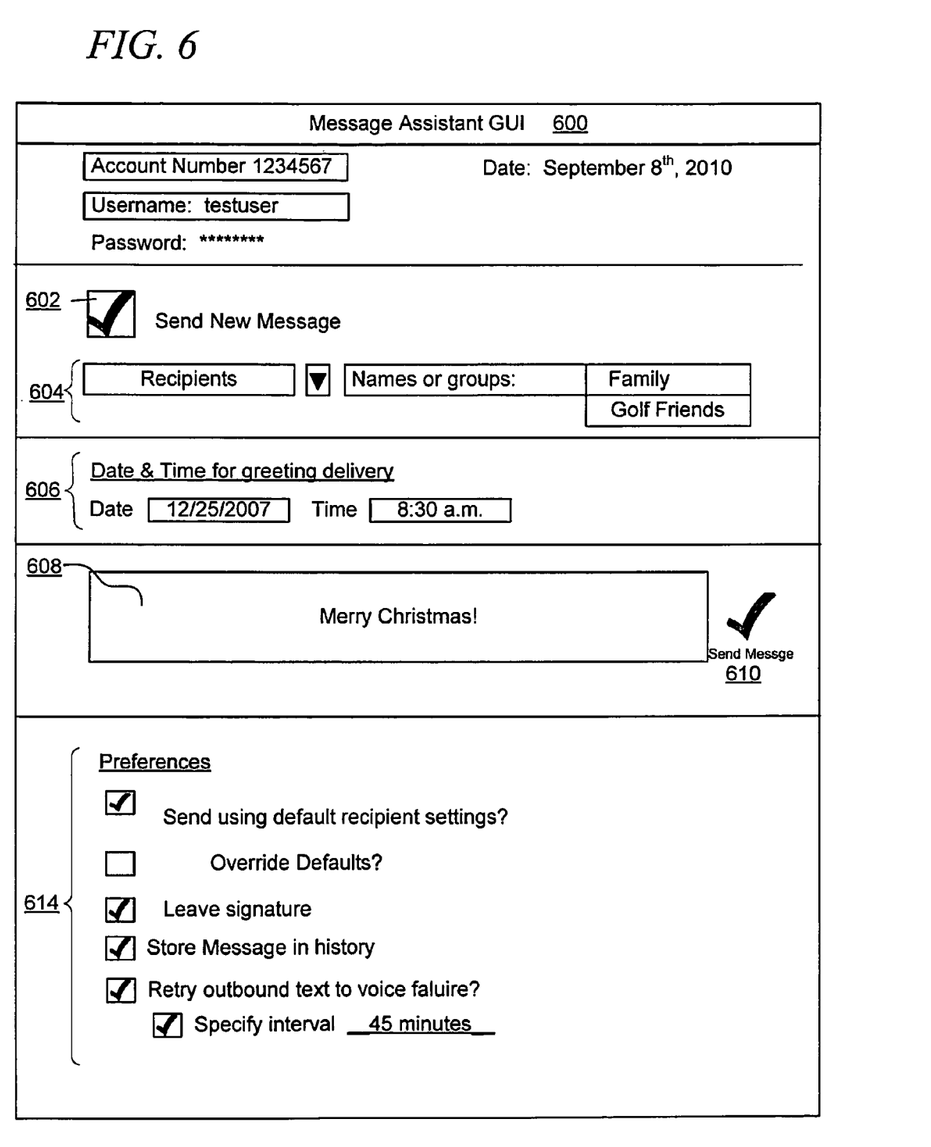
FIG. 6 is a pictorial representation of a messaging assistant graphical user interface in accordance with an illustrative embodiment.

FIG. 5 is a pictorial representation of a messaging assistant graphical user interface in accordance with an illustrative embodiment. The GUI 500 is a particular implementation of the GUI 132 of FIG. 1. The GUI 500 may be implemented as a page, interface, or graphic of a web page. The GUI 500 may also be a screen displayed by the messaging assistant application to send and receive information from the user. Any number of screens or interfaces may be displayed to a user, FIGS. 5 and 6 are examples of the many interfaces that may be implemented.

The GUI 500 may include an account number 502, a date 504, a username 506, a password 508, recipients 510, section 512, and contacts 514, 516, and 518. The account number 502 may specify an identifier for the user's service or authorization to utilize the messaging assistant. The date 504 specifies the current date as a reference when importing contacts or generating a message for one or more recipients. The username 506 and password 508 may further provide a method of verifying the user is authorized to access the GUI 500 of the messaging assistant. The username 506 and password 508 may also be required to make changes, reconfigure the messaging assistant, or send a message.

The recipients 510 specify the one or more contacts or groups that are configured to receive a message. The recipients 510 may individually list each contact or the applicable group that will be receiving one or more messages input by the user. The recipients 510 may be compiled into groups with similar names when imported or extracted from other servers and services. For example, all contacts with family name groups may be compiled into a single group with redundant entries ignored.

Section 512 may allow a user to enter or edit new contacts. In addition to adding new contacts, the contacts may be included in one or more groups based on user feedback. Section 512 may allow a user to enter additional methods of communicating with a contact, such as a new cell phone number, email address, or VoIP number or address.

Contacts 514, 516, and 518 specify how each contact may receive communications. The contacts 514, 516, and 518 may specify names, applicable methods of communication, phone numbers, email addresses, usernames, nicknames, account numbers, applicable groups, or other identifying information. In one embodiment, the default method of communication for each of the contacts 514, 516, and 518 may be listed first.

The number of contacts or groups that may be included as recipients 510 is not limited. The GUI 500 may display the contact information in any number of formats based on the level of detail or group members the user requests information for.

FIG. 6 is a pictorial representation of a messaging assistant graphical user interface in accordance with an illustrative embodiment. The GUI 600 may be a page, display, screen, or interface similar to that illustrated in FIG. 6. The GUI 600 may include message indicator 602, recipient 604, date selection 606, message 608, transmission indicator 610, and preferences 614.

The message indicator 602 may allow a user to select to send a new message or modify a message that is pending. Any number of messages 602 may be configured for transmission at any given time. The recipients 604 specify the intended recipients for the message as previously described.

The date selection 606 indicates a date and time at which the designated message will be sent. The date and time may be displayed for the user's time zone or a selected time zone. The message 608 is the interface for receiving a message for transmission to the recipients 604. The message 608 may allow a user to insert text, graphics, video, pictures, audio files, or text. The transmission indicator 610 or send button activates the message 608 for transmission. For example, if the message 608 is to be sent immediately without delay, the transmission button 610 sends the message to the recipients 604. However, if the message 608 is to be sent some time in the future, the transmission button 610 activates the message 608 for the future transmission.

The preferences 614 may specify user preferences or communications preferences for communicating with the one or more recipients 604. For example, the preferences 614 may allow a user to specify whether to send messages using the default settings or to override the defaults and send the message 608 based on a user selection. The message 608 may also be sent with a signature and stored for later review or access if specified. In one embodiment, the preferences 614 may specify what action is to be taken if the transmission of the message 608 is unsuccessful. For example, if a text-to-voice message may not be directly delivered, the message 608 may be reattempted every forty five minutes or a specified number of times. Alternatively, a priority may be set for messages so that if one delivery method is unsuccessful other delivery methods may be attempted. For example, if an email message is bounced back, a text message may be sent to the user's cell phone.

The illustrative embodiments allow a user to plan ahead or send messages in the future using a contact list that contains up-to-date information. As a result, a user may send applicable messages by accessing the Internet or other available network connections from any computing or communications-enabled device.

The previous detailed description is of a small number of embodiments for implementing the invention and is not intended to be limiting in scope. The following claims set forth a number of the embodiments of the invention disclosed with greater particularity.

What is claimed:

1. A method for utilizing a messaging assistant, the method comprising:
    said messaging assistant updating a contact list by periodically polling a plurality of servers, including a plurality of servers associated with different online services, retrieving one or more contact lists from each of the servers, and integrating the contact lists from each of the servers into the updated contact list;
    said messaging assistant receiving preferences for one or more modes of communicating with contacts on said updated contact list, said one or more modes including at least voice, text message, electronic mail, and video, said preferences including, for at least one of the one or more modes, a backup communication method to use if messages sent by the at least one mode are undeliverable and criteria specifying, for the at least one mode, when messages should be considered undeliverable;
    said messaging assistant receiving a message made by a user that includes substantive information other than said contact list and said preferences, said message to be sent to a group listed in said updated contact list including one or more contacts, at a predetermined time specified by said user and provided by said user to said messaging assistant; and
    sending said user-determined message, including the substantive information to the group at said predetermined time specified by said user based on the preferences.

2. The method according to claim 1, further comprising:
    accessing the messaging assistant through a network connection, wherein said preferences and said message are received by said messaging assistant through a network connection, and wherein said message is any of a text message, chat message, and email message.

3. The method according to claim 2, wherein said message is converted from text to voice and delivered to at least one of said one or more contacts.

4. The method according to claim 1, wherein said message is converted to a format deliverable to each of said one or more contacts of the group based on said preferences.

5. The method according to claim 1, wherein said updating comprises:
    synchronizing said contact list with said one or more contact lists at pre-defined intervals.

6. The method according to claim 5, wherein said updating further comprises: receiving user input to configure said contact list to synchronize with said one or more contact lists, wherein said user input is a selection to synchronize immediately or a time interval.

7. The method according to claim 1, wherein said preferences specify communication options for each of said one or more contacts.

8. The method according to claim 7, wherein said preferences indicate a priority for attempting to resend said message in the event a delivery method is unsuccessful.

9. The method according to claim 1, wherein said updating further comprises: extracting said one or more contact lists from one or more servers to form said contact list, wherein said contact list is a master contact list, and wherein redundant contacts are not included and groups of contacts are combined based on a group name.

10. The method according to claim 1, further comprising:
    prompting said user to specify said preferences or utilize a default setting for delivering said message.

11. The method of claim 1, further comprising making a determination regarding success or failure of delivery of said user-made message for each said contact, and said messaging assistant resending said user-made message via a different mode of communicating to each contact for which a failure of delivery occurred.

12. A messaging assistant system, said system comprising:
    a scheduler configured to receive preferences for communicating with one or more contacts and a time for sending a message, the preferences including preferences for one or more modes of communicating with contacts on a updated contact list, said one or more modes including at least voice, text message, electronic mail, and video, said preferences including, for at least one of the one or more modes, a backup communication method to use if messages sent by the at least one mode are undeliverable and criteria specifying, for the at least one mode, when messages should be considered undeliverable;
    a message coordinator configured to receive said message as sent by a user via a graphical user interface to be sent to said one or more contacts; and
    said contact list configured to store and update said updated contact list by periodically polling a plurality of servers, including a plurality of servers associated with different online services, retrieving on or more contact lists from each of the servers, and integrating the contact lists from each of the servers into the updated contact list, wherein the updated contact list contains the one or more contacts.

13. The system according to claim 12, wherein said user accesses the messaging assistant through a network connection using a communications device, wherein said message coordinator sends the message to said one or more contacts at the time, and wherein said one or more contacts are a group.

14. The system according to claim 12, wherein said messaging assistant further comprises: a user interface accessible through a network connection configured to allow said user to enter said message and update said preferences for said contact list.

15. The system according to claim 12, wherein said message coordinator resends said message based on a priority indicated in said preferences in response to determining said message was undeliverable.

16. The system according to claim 12, wherein said messaging assistant system is integrated as part of a server and accessible by a communications device through a wire line or wireless network.

17. A messaging assistant comprising:
a processor for executing a set of instructions; and
a memory for storing said set of instructions, wherein said set of instructions are configured to update a contact list from one or more contact lists;
wherein one of said processor and said memory is adapted to:
update a contact list by periodically polling a plurality of servers, including a plurality of servers associated with different online services, retrieving one or more contact lists from each of the servers, and integrating the contact lists from each of the servers into the updated contact list
receive preferences for communicating with individuals on said contact list, said preferences including preferences for one or more modes of communicating with contacts on said updated contact list, said one or more modes including at least voice, text message, electronic mail, and video, said preferences including, for at least one of the one or more modes, a backup communication method to use if messages sent by the at least one mode are undeliverable and criteria specifying, for the at least one mode, when messages should be considered undeliverable;
receive a user-created message from a user to be sent to a group in said contact list including one or more users at a time specified by said user; and
send said user-created message to said group at the time based on said preferences.

18. The messaging assistant according to claim 17, wherein redundant contacts are removed from said contact list and groups of contacts are combined based on a group name.

19. The messaging assistant according to claim 17, wherein said set of instructions resends said message based on a priority indicated in said preferences in response to determining said message was undeliverable.

20. The messaging assistant according to claim 17, wherein said set of instructions automatically extracts said one or more contact lists for integration with said contact list at a specified time interval or based on changes made to said one or more contact lists as determined by said messaging assistant by polling one or more servers storing said one or more contact lists.

21. The method of claim 1, wherein said preferences include one or more modes of transmitting information, and each preference is specific to a particular contact.

22. The method of claim 21, wherein said sending includes sending the message to each particular contact in the group by a mode specified by the preference of that particular contact.

23. A method, comprising:
providing a messaging assistant to a user, said messaging assistant including an application or device accessible through a network connection;
said messaging assistant updating a contact list by periodically polling a plurality of servers, including a plurality of servers associated with different online services, retrieving one or more contact lists from each of the servers, and integrating the contact lists from each of the servers into the updated contact list;
using said messaging assistant to send a message to one or more contacts;
wherein said using includes accessing a list of said contacts, each entry in said list including a contact's identity, information concerning at least one way of contacting that contact, and that contact's preference of one or more modes the messaging assistant should used to send said message to that contact, said one or more modes including at least voice, text message, electronic mail, and video, said preferences including, for at least one of the one or more modes, a backup communication method to use if messages sent by the at least one mode are undeliverable and criteria specifying, for the at least one mode, when messages should be considered undeliverable;
wherein said using includes the user providing said message to the messaging assistant; and
wherein said using includes sending said message by said messaging assistant to each contact in said list of contacts according to the contacts' preferences.

24. The method of claim 23, further comprising resending said message to at least one of the contacts to which the sending was unsuccessful, said resending including resending to said at least one of the contacts in a different way than used in said sending.

* * * * *